(12) United States Patent
Koskinen et al.

(10) Patent No.: US 11,191,012 B2
(45) Date of Patent: Nov. 30, 2021

(54) METHODS AND APPARATUSES FOR MULTIPLE SYSTEM INFORMATION HANDLING

(71) Applicant: Nokia Technologies Oy, Espoo (FI)

(72) Inventors: Jussi-Pekka Koskinen, Oulu (FI); Jarkko Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/076,519

(22) PCT Filed: Jan. 27, 2017

(86) PCT No.: PCT/FI2017/050045
§ 371 (c)(1),
(2) Date: Aug. 8, 2018

(87) PCT Pub. No.: WO2017/137657
PCT Pub. Date: Aug. 17, 2017

(65) Prior Publication Data
US 2019/0045429 A1  Feb. 7, 2019

Related U.S. Application Data

(60) Provisional application No. 62/293,499, filed on Feb. 10, 2016.

(51) Int. Cl.
*H04W 4/00* (2018.01)
*H04W 48/16* (2009.01)
(Continued)

(52) U.S. Cl.
CPC .......... *H04W 48/16* (2013.01); *H04B 17/318* (2015.01); *H04L 5/0053* (2013.01); *H04W 4/70* (2018.02); *H04W 48/12* (2013.01)

(58) Field of Classification Search
CPC ....... H04W 48/16; H04W 4/70; H04W 48/12; H04W 80/04; H04W 88/06; H04W 88/08;
(Continued)

(56) References Cited

U.S. PATENT DOCUMENTS

2011/0312328 A1* 12/2011 Choi ...................... H04W 72/02
455/450
2013/0155983 A1* 6/2013 Choi ................... H04W 72/082
370/329
(Continued)

FOREIGN PATENT DOCUMENTS

WO     2014/171868 A1    10/2014

OTHER PUBLICATIONS

"Revised WI: Further LTE Physical Layer Enhancements for MTC", 3GPP TSG-RAN meeting #67, RP-150492, Agenda: 11.3.2, Ericsson, Mar. 9-12, 2015, 9 pages.
(Continued)

*Primary Examiner* — Chuong T Ho
(74) *Attorney, Agent, or Firm* — Squire Patton Boggs (US) LLP

(57) ABSTRACT

Systems, methods, apparatuses, and computer program products for multiple system information handling are provided. One method includes receiving, by a UE, one or more instances of system information from the network. For example, the system information may be received in one or more SIBs from an eNB. In one example, the instances of system information may include at least one of legacy system information or eMTC system information. The method may further include determining which of the received instances of system information the UE should use.

13 Claims, 3 Drawing Sheets

(51) Int. Cl.
*H04W 48/12* (2009.01)
*H04B 17/318* (2015.01)
*H04W 4/70* (2018.01)
*H04L 5/00* (2006.01)

(58) Field of Classification Search
CPC .... H04W 28/04; H04W 72/04; H04B 17/318; H04L 5/0053; H04L 5/0007
USPC .................................................. 370/329, 330
See application file for complete search history.

(56) References Cited

U.S. PATENT DOCUMENTS

| | | | |
|---|---|---|---|
| 2014/0098761 A1 | 4/2014 | Lee et al. | |
| 2015/0181624 A1* | 6/2015 | Hwang | H04W 74/0841 370/329 |
| 2015/0236777 A1* | 8/2015 | Akhtar | H04W 48/20 455/438 |
| 2015/0257173 A1* | 9/2015 | You | H04B 17/318 370/330 |
| 2016/0073326 A1* | 3/2016 | Vannithamby | H04W 48/12 370/312 |
| 2016/0242206 A1* | 8/2016 | Ohlsson | H04W 72/1231 |
| 2016/0323846 A1* | 11/2016 | Park | H04L 5/0069 |
| 2016/0338113 A1* | 11/2016 | Wu | H04W 74/0833 |
| 2016/0374109 A1* | 12/2016 | Rico Alvarino | H04W 4/70 |
| 2017/0141833 A1* | 5/2017 | Kim | H04L 1/0029 |

OTHER PUBLICATIONS

"Revised Work Item: Narrowband IoT (NB-IoT)", 3GPP TSG-RAN meeting #70, RP-152284, Agenda: 11.7.17, Huawei, Dec. 7-10, 2015, 11 pages.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.0.0, Dec. 2015, pp. 1-507.

International Search Report and Written Opinion received for corresponding Patent Cooperation Treaty Application No. PCT/FI2017/050045, dated Apr. 12, 2017, 15 pages.

"Open Issues on SIB for LC-MTC", 3GPP TSG-RAN Working Group 2 meeting #89bis, R2-151209, Agenda: 7.4.2, CATT, Apr. 20-24, 2015, 8 pages.

"MIB for Rel-13 Low Complexity and Coverage Enhanced UEs", 3GPP TSG-RAN Working Group 2 meeting #92, R2-156771, Agenda: 7.4.2, Ericsson, Nov. 16-20, 2015, pp. 1-9.

Office action received for corresponding Indonesian Patent Application No. PID201806574, dated Sep. 17, 2019, 2 pages of office action and 2 pages of office action translation available.

* cited by examiner

METHODS AND APPARATUSES FOR MULTIPLE SYSTEM INFORMATION HANDLING

CROSS-REFERENCE TO RELATED APPLICATIONS

This application was originally filed as Patent Cooperation Treaty Application No. PCT/FI2017/050045 filed Jan. 27, 2017 which claims priority benefit to U.S. Provisional Patent Application No. 62/293,499, filed Feb. 10, 2016.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-Advanced Pro, LTE-M, and/or 5G radio access technology. In particular, some embodiments may relate to system information handling in such communications networks and may be specifically applicable, for example, in networks supporting machine-to-machine (M2M) communications.

Description of the Related Art

Universal Mobile Telecommunications System (UMTS) Terrestrial Radio Access Network (UTRAN) refers to a communications network including base stations or Node Bs, and, for example, radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

5G is the new generation of radio systems and network architecture delivering extreme broadband and ultra-robust, low latency connectivity and massive networking for the Internet of Things (IoT) to enable the programmable world, which can transform individual lives, the economy and society as a whole. With IoT and machine-to-machine (M2M) communication becoming more widespread, there will be a growing need for networks that meet the needs of lower power, low data rate, and long battery life. Narrowband IoT-LTE (NB-IoT) is envisioned to operate on 180/200 kHz channel. The deployment of NB-IoT may be in-band LTE, a guard band to LTE, UMTS or other system as well as stand-alone on a specific carrier.

SUMMARY

One embodiment is directed to a method, which may include signaling, by network node, system information in one or more system information blocks (SIBs). The system information comprises at least one of legacy system information or enhanced machine-type communication (eMTC) system information. The method may also include signaling, to one or more user equipment (UEs), which of the legacy system information or the enhanced machine-type communication (eMTC) system information the user equipment should use.

Another embodiment is directed to an apparatus, which may include at least one processor and at least one memory including computer program code. The at least one memory and the computer program code are configured, with the at least one processor, to cause the apparatus at least to signal system information in one or more system information blocks (SIBs), where the system information comprises at least one of legacy system information or enhanced machine-type communication (eMTC) system information, and to signal, to one or more user equipment (UEs), which of the legacy system information or the enhanced machine-type communication (eMTC) system information the user equipment should use.

Another embodiment is directed to an apparatus that includes means for signaling system information in one or more system information blocks (SIB s). The system information comprises at least one of legacy system information or enhanced machine-type communication (eMTC) system information. The apparatus also includes means for signaling, to one or more user equipment (UEs), which of the legacy system information or the enhanced machine-type communication (eMTC) system information the user equipment should use.

Another embodiment is directed to a method, which may include receiving, by a user equipment (UE), one or more instances of system information from a network. The system information is received in one or more system information blocks (SIBs), and the instances of system information comprises at least one of legacy system information or enhanced machine-type communication (eMTC) system information. The method may also include determining which of the received instances of system information the user equipment should use.

Another embodiment is directed to an apparatus, which may include at least one processor and at least one memory including computer program code. The at least one memory and the computer program code are configured, with the at least one processor, to cause the apparatus at least to receive one or more instances of system information from a network. The system information is received in one or more system information blocks (SIBs), and the instances of system information comprises at least one of legacy system information or enhanced machine-type communication (eMTC) system information. The at least one memory and the computer program code may be further configured, with the at least one processor, to cause the apparatus at least to determine which of the received instances of system information the apparatus should use.

Another embodiment is directed to an apparatus that includes means for receiving one or more instances of system information from a network. The system information is received in one or more system information blocks (SIBs), and the instances of system information comprise at least one of legacy system information or enhanced machine-type communication (eMTC) system information. The apparatus may also include means for determining which of the received instances of system information the apparatus should use.

BRIEF DESCRIPTION OF THE DRAWINGS

For proper understanding of the invention, reference should be made to the accompanying drawings, wherein.

DETAILED DESCRIPTION

Figure 1:
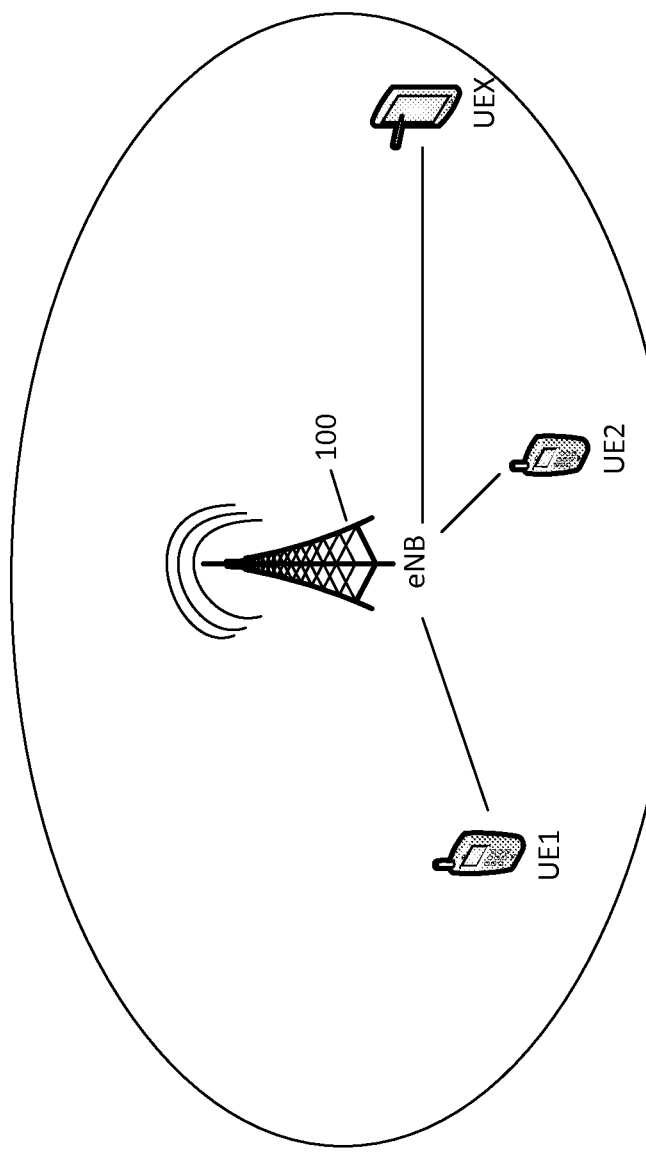
FIG. 1 illustrates an example of a system diagram according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for multiple system information handling, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to machine type communication (MTC), also referred to as machine-to-machine (M2M). More specifically, some embodiments relate to coverage enhancements, such as those introduced in 3GPP Release 13 by the work item on "Further LTE Physical Layer Enhancements for MTC" (3GPP RP-150492). In addition, certain embodiments may be utilized in 3GPP Release 13 work item on NB-IOT (3GPP RP-152284).

One example scenario in which an embodiment of the invention may be applicable is described in the following. For instance, the UE may receive multiple instances of the system information blocks (SIBs), such as SIB1 and SIB1-BR (bandwidth reduced). For some SIB fields, the network sets the same content to all SIB instances, and for some SIB fields the content may be different in different SIB instances. This may lead to non-deterministic and undesired UE behavior as the UE may change the parameter applied whenever different instance of SIB is received. In some scenario, the UE may use wrong version of the SIB.

As a further example, for a UE that supports both legacy SIB reception and enhanced machine-type communication (eMTC) enhanced coverage SIB reception the following scenario may occur: the UE receives legacy system information where cellAccessRelatedInfo indicates that the access is allowed, and also receives eMTC system information where cellAccessRelatedInfo indicates that the access is not allowed. In this situation, the UE has received conflicting system information and must decide what to do. If nothing is defined, then the UE could switch between two different SIBs and the UE behavior would be very undeterministic for the network. It may even occur that, once the UE has received SIB1-BR, it may not try to acquire SIB1 even if it would be in "normal coverage" mode.

Certain embodiments of the invention may address at least the issues noted above and provide technical solutions to overcome one or more of the problems outlined above.

3GPP RAN2 (or RAN working group 2 for radio layer 2 and radio layer 3) has previously made certain working assumptions and agreements about system information content. For example, the UE shall consider all fields with the same identifier name as the same field, even if the fields are present in different SIB instances. Also, for instance, whenever the UE acquires SIB or SIB bis, the new field value shall replace the old one and an absent field shall be released if specified as Optional Release (OR). In addition, the following fields could be provided in new SIB instances and may have the same value as the corresponding fields provided in legacy SIBs: trackingAreaCode, cellIdentity, intraFreqReselection, p-Max, freqBandIndicator, tdd-Config, ims-EmergencySupport-r9, freqInfo and mbsfn-SubframeConfigList, cellBarred and plmn-IdentityList. The following fields could be provided in new SIB instances but may have different values than the corresponding fields provided in legacy SIBs: cellAccessRelatedInfo, schedulingInfoList and si-WindowLength. The following fields may be provided differently to legacy coverage (LC) and enhanced coverage (EC): cellAccessRelatedInfo.

FIG. 1 illustrates an example system diagram in which embodiments of the invention may be applicable. As illustrated in FIG. 1, the system may include at least one eNB 100 and one or more UEs, UE1, UE2, . . . UEx. The UEs may be configured to support both legacy and eMTC system information. eNB 100 may be configured to broadcast or signal system information, for example, in one or more SIBs.

Embodiments of the invention provide several alternatives for system information handling for the UE which supports both legacy and eMTC system information. One embodiment may include radio condition assisted system information handling. In an embodiment, the UE in normal coverage may use only the legacy system information and eMTC system information is ignored, postponed, stored, and/or not used, if received. In another embodiment, the UE in extended coverage may use the system information received in extended coverage. For example, if eMTC system information is not received, the legacy system information may be used.

According to certain embodiments, coverage level specific system information handling may also be considered. According to an embodiment, the network (e.g., eNB 100) may signal or broadcast system information for different coverage levels. For example, in this embodiment, SIB instances for each coverage level may be signaled/broadcasted, for example, for normal, shallow, and deep coverage. The scheduling and the content may differ in the different SIB instances. In an embodiment, the network may also signal with dedicated and/or broadcast signaling how many system information instances are signaled/broadcasted. In addition, scheduling information, such as the number of repetitions, time and frequency related information, power, modulation, coding, or transport block size, may be provided.

Upon receiving the broadcast SIB instances, the UE may determine which system information it should use. For example, in one embodiment, the UE may then use the system information which is specific to that UE's coverage level. According to an embodiment, the UE may determine which system information it should use based on radio quality and/or power measurements. In one embodiment, the criteria (e.g., signal power/quality threshold) for using each system information instance may be configured for the UE with dedicated and/or broadcast signaling, or may even be predefined in the 3GPP specifications. For instance, in one example, the UE may determine its coverage level based on the radio power and quality measurements, such as reference signal received power (RSRP), received signal strength indication (RSSI), or reference signal received quality (RSRQ). It is noted that the above embodiments may also be joined together in any combination.

In some situations, there may be a conflict in the content of the system information where the UE receives both instances (i.e., both legacy and eMTC system information is received by a UE). According to one embodiment, the legacy system information overrides the eMTC system information. According to another embodiment, the eMTC system information overrides the legacy system information. In yet another embodiment, the UE may ignore, postpone, or delete conflicting eMTC or legacy system information. According to a further embodiment, the most recently received system information is taken into use by the UE. It is noted that the above embodiments may also be combined.

According to an alternative embodiment, the UE supporting both eMTC and legacy system information may always use one of eMTC system information or legacy system information. In yet another embodiment, the network may indicate to the UE through signaling which system information the UE should use: eMTC system information or legacy system information.

According to yet another embodiment, the network may indicate via legacy system information what eMTC system information is broadcasted. In one example, the UE may not access a cell in extended coverage before the eMTC system information is received. Further, as an example, coverage level change in the UE may trigger system information reception in the UE, and the UE may attempt to receive coverage level specific system information. In another example, coverage level change in the UE may trigger the change of the utilized system information. In this example, the UE may start using the current coverage level specific system information.

Figure 2A:
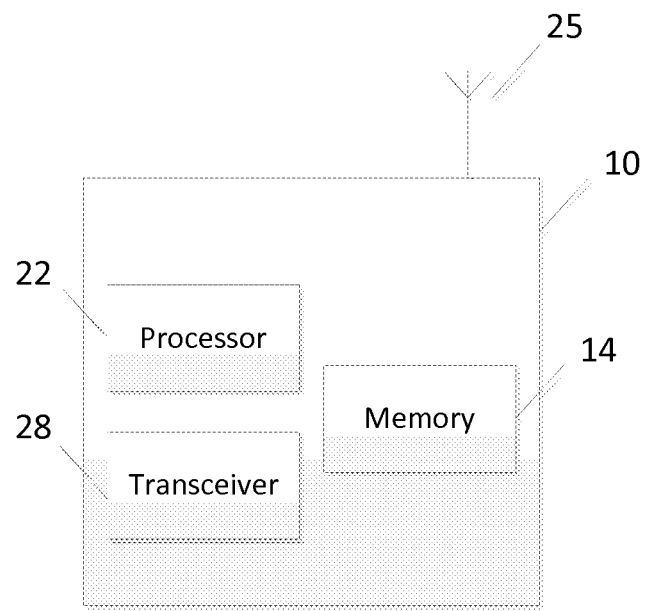
FIG. 2a illustrates an example block diagram of an apparatus, according to one embodiment.

FIG. 2a illustrates an example of an apparatus 10 according to an embodiment. In an embodiment, apparatus 10 may be a node, host, or server in a communications network or serving such a network. For example, in certain embodiments, apparatus 10 may be a network access node or network entity for a radio access network, such as LTE or LTE-A. Thus, in certain embodiments, apparatus 10 may be a base station or eNB. However, in other embodiments, apparatus 10 may be other components within a radio access network. It should be noted that one of ordinary skill in the art would understand that apparatus 10 may include components or features not shown in FIG. 2a.

As illustrated in FIG. 2a, apparatus 10 includes a processor 22 for processing information and executing instructions or operations. Processor 22 may be any type of general or specific purpose processor. While a single processor 22 is shown in FIG. 2a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or network entity, such as a base station or eNB, for example. According to certain embodiments, apparatus 10 may be controlled by memory 14 and processor 22 to signal or broadcast system information, for example, in one or more SIBs. The system information may be legacy system information or eMTC system information. In certain embodiments, apparatus 10 may also be controlled by memory 14 and processor 22 to signal or broadcast, to UE(s), which system information (i.e., legacy system information or eMTC system information) the UE(s) should use.

In certain embodiments, apparatus 10 may be controlled by memory 14 and processor 22 to signal or broadcast system information for different coverage levels. For example, in an embodiment, apparatus 10 may be controlled by memory 14 and processor 22 to signal or broadcast SIB instances for each coverage level, such as normal, shallow, and deep coverage. The scheduling and the content may differ in the different SIB instances. In an embodiment, apparatus 10 may be controlled by memory 14 and processor 22 to signal with dedicated and/or broadcast signaling how many system information instances are signaled/broadcasted. In addition, apparatus 10 may be controlled by memory 14 and processor 22 to signal scheduling information, such as the number of repetitions, time and frequency related information, power, modulation, coding, or transport block size.

Figure 2B:
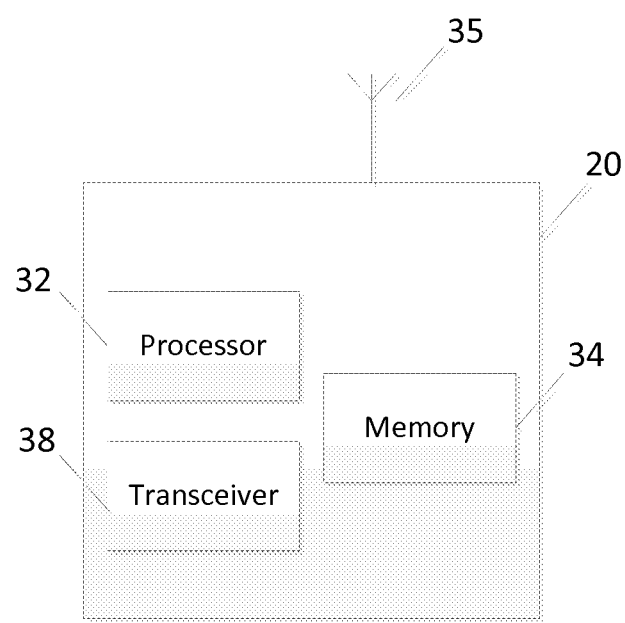
FIG. 2b illustrates an example block diagram of an apparatus, according to another embodiment.

FIG. 2b illustrates an example of an apparatus 20 according to another embodiment. In an embodiment, apparatus 20 may be a node or element in a communications network or associated with such a network, such as a mobile device, UE, machine type UE, NB-IoT UE, or other device. It should be noted that one of ordinary skill in the art would understand that apparatus 20 may include components or features not explicitly shown in FIG. 2b.

As illustrated in FIG. 2b, apparatus 20 includes a processor 32 for processing information and executing instructions or operations. Processor 32 may be any type of general or specific purpose processor. While a single processor 32 is shown in FIG. 2b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. In an embodiment, apparatus 10 may be a UE that supports both legacy system information and eMTC system information. According to an embodiment, apparatus 20 may be controlled by memory 34 and processor 32 to receive one or more instances of system information from the network. For example, the system information may be received in one or more SIBs from an eNB. In an embodiment, the system information may include at least one of legacy system information or eMTC system information. Further, in some embodiments, the system information may be received for different coverage levels, such as normal, shallow, or deep coverage.

According to an embodiment, apparatus 20 may be controlled by memory 34 and processor 32 to determine which of the received instances of system information that apparatus 10 should use. In one embodiment, apparatus 20 may be controlled by memory 34 and processor 32 to determine which of the received instances of system information to use based on radio quality and/or power measurements, such as reference signal received power (RSRP), received signal strength indication (RSSI), or reference signal received quality (RSRQ). In other embodiments, apparatus 20 may be controlled by memory 34 and processor 32 to receive an explicit indication from the network indicating which of the received instances of system information to use.

In an embodiment, apparatus 20 may be further controlled by memory 34 and processor 32 to receive an indication of the number of system information instances that are broadcasted. According to some embodiments, apparatus 20 may be controlled by memory 34 and processor 32 to also receive scheduling information, such as number of repetitions, time and frequency related information, power, modulation, coding, or transport block size.

Figure 3A:
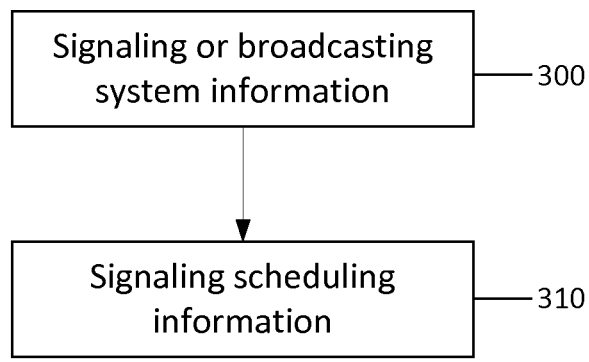
FIG. 3a illustrates a flow diagram of a method, according to one embodiment.

FIG. 3a illustrates an example flow diagram of a method, according to one embodiment. The method of FIG. 3a may be performed by a network node, such as an eNB. The method may include, at 300, signaling or broadcasting system information, for example, in one or more SIBs. The system information may be legacy system information or eMTC system information. In certain embodiments, the signaling may further include signaling or broadcasting, to UE(s), which system information (i.e., legacy system information or eMTC system information) the UE(s) should use.

In certain embodiments, the method may include signaling or broadcasting system information for different coverage levels. For example, in an embodiment, the method may include signaling or broadcasting SIB instances for each coverage level, such as normal, shallow, and deep coverage. The scheduling and the content may differ in the different SIB instances. In an embodiment, the method may include signaling with dedicated and/or broadcast signaling how many system information instances are signaled/broadcasted. In addition, the method may include, at 310, signaling scheduling information, such as the number of repetitions, time and frequency related information, power, modulation, coding, or transport block size.

Figure 3B:
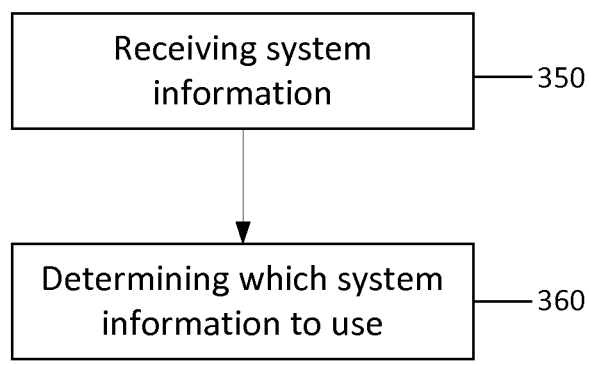
FIG. 3b illustrates a flow diagram of a method, according to one embodiment.

FIG. 3b illustrates an example flow diagram of a method, according to one embodiment. The method of FIG. 3b may be performed by a mobile node or device, such as a UE that supports both legacy system information and eMTC system information. The method may include, at 350, receiving one or more instances of system information from the network. For example, the system information may be received in one or more SIBs from an eNB. In an embodiment, the system information may include at least one of legacy system information or eMTC system information. Further, in some embodiments, the system information may be received for different coverage levels, such as normal, shallow, or deep coverage.

According to an embodiment, the method may include, at 360, determining which of the received instances of system information the UE should use. In one embodiment, the determining may include determining which of the received instances of system information to use based on radio quality and/or power measurements, such as reference signal received power (RSRP), received signal strength indication (RSSI), or reference signal received quality (RSRQ). In other embodiments, the method may include receiving an explicit indication from the network indicating which of the received instances of system information to use.

In an embodiment, the method may include receiving an indication of the number of system information instances that are broadcasted. According to some embodiments, the method may also include receiving scheduling information, such as number of repetitions, time and frequency related information, power, modulation, coding, or transport block size.

According to embodiments, programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

In view of the above, embodiments of the invention provide several advantages and result in significant technical improvements to communications networks and radio systems. As discussed in detail above, embodiments result in predictable and deterministic UE behaviour. In addition, embodiments optimize signalling related to system information handling. In other words, embodiments prevent the need to receive multiple system information instances in some scenarios.

One embodiment is directed to a method including signaling or broadcasting, by an eNB, system information, for example, in one or more SIBs. The system information may be legacy system information or eMTC system information. In certain embodiments, the signaling may further include signaling or broadcasting, to UE(s), which system information (i.e., legacy system information or eMTC system information) the UE(s) should use. In certain embodiments, the method may include signaling or broadcasting system information for different coverage levels. For example, in an embodiment, the method may include signaling or broadcasting SIB instances for each coverage level, such as normal, shallow, and deep coverage. Each coverage level may depend on the distance between the UE(s) and the serving eNB or eMTC, the received signal power at the UE(s), or else. The scheduling and the content may differ in the different SIB instances. In an embodiment, the method may include signaling with dedicated and/or broadcast signaling how many system information instances are signaled/broadcasted. In addition, the method may include signaling scheduling information, such as the number of repetitions, time and frequency related information, power, modulation, coding, or transport block size.

Another embodiment is directed to an apparatus that includes at least one processor, and at least one memory including computer program code. The at least one memory and the computer program code may be configured, with the at least one processor, to signal or broadcast system information, for example, in one or more SIBs. The system information may be legacy system information or eMTC system information. In certain embodiments, the signaling may further include signaling or broadcasting, to UE(s), which system information (i.e., legacy system information or eMTC system information) the UE(s) should use. In certain embodiments, the at least one memory and the computer program code may be configured, with the at least one processor, to signal or broadcast system information for different coverage levels. For example, in an embodiment, the at least one memory and the computer program code may be configured, with the at least one processor, to signal or broadcast SIB instances for each coverage level, such as normal, shallow, and deep coverage. The scheduling and the content may differ in the different SIB instances. In an embodiment, the at least one memory and the computer program code may be configured, with the at least one processor, to signal with dedicated and/or broadcast signaling how many system information instances are signaled/broadcasted. In addition, the at least one memory and the computer program code may be configured, with the at least one processor, to signal scheduling information, such as the number of repetitions, time and frequency related information, power, modulation, coding, or transport block size.

Another embodiment is directed to an apparatus including transmitting means for signaling or broadcasting system information, for example, in one or more SIBs. The system information may be legacy system information or eMTC system information. In certain embodiments, the transmitting means may further include means for signaling or broadcasting, to UE(s), which system information (i.e., legacy system information or eMTC system information) the UE(s) should use. In certain embodiments, the transmitting means may include means for signaling or broadcasting system information for different coverage levels. For example, in an embodiment, the transmitting means may include means for signaling or broadcasting SIB instances for each coverage level, such as normal, shallow, and deep coverage. The scheduling and the content may differ in the different SIB instances. In an embodiment, the transmitting means may include means for signaling with dedicated and/or broadcast signaling how many system information instances are signaled/broadcasted. In addition, the transmitting means may include means for signaling scheduling information, such as the number of repetitions, time and frequency related information, power, modulation, coding, or transport block size.

Another embodiment is directed to a computer program embodied on a non-transitory computer readable medium. The computer program may be controlled by a processor to perform a process that includes signaling or broadcasting system information, for example, in one or more SIBs. The system information may be legacy system information or eMTC system information. In certain embodiments, the signaling may further include signaling or broadcasting, to UE(s), which system information (i.e., legacy system information or eMTC system information) the UE(s) should use. In certain embodiments, the process may include signaling or broadcasting system information for different coverage levels. For example, in an embodiment, the process may include signaling or broadcasting SIB instances for each coverage level, such as normal, shallow, and deep coverage. The scheduling and the content may differ in the different SIB instances. In an embodiment, the process may include signaling with dedicated and/or broadcast signaling how many system information instances are signaled/broadcasted. In addition, the process may include signaling scheduling information, such as the number of repetitions, time and frequency related information, power, modulation, coding, or transport block size.

Another embodiment is directed to a method that may include receiving, by a UE, one or more instances of system information from the network. For example, the system information may be received in one or more SIBs from an eNB. In an embodiment, the system information may include at least one of legacy system information or eMTC system information. Further, in some embodiments, the system information may be received for different coverage levels, such as normal, shallow, or deep coverage. According to an embodiment, the method may further include determining which of the received instances of system information the UE should use. In one embodiment, the determining may include determining which of the received instances of system information to use based on radio quality and/or power measurements, such as reference signal received power (RSRP), received signal strength indication (RSSI), or reference signal received quality (RSRQ). In other embodiments, the method may include receiving an explicit indication from the network indicating which of the received instances of system information to use. In an embodiment, the method may include receiving an indication of the number of system information instances that are broadcasted. According to some embodiments, the method may also include receiving scheduling information, such as number of repetitions, time and frequency related information, power, modulation, coding, or transport block size.

Another embodiment is directed to an apparatus that includes at least one processor, and at least one memory including computer program code. The at least one memory and the computer program code may be configured, with the at least one processor, to receive one or more instances of system information from the network. For example, the system information may be received in one or more SIBs from an eNB. In an embodiment, the system information may include at least one of legacy system information or eMTC system information. Further, in some embodiments, the system information may be received for different coverage levels, such as normal, shallow, or deep coverage. According to an embodiment, the at least one memory and the computer program code may be further configured, with the at least one processor, to determine which of the received instances of system information the apparatus should use. In one embodiment, the determining may include determining which of the received instances of system information to use based on radio quality and/or power measurements, such as reference signal received power (RSRP), received signal strength indication (RSSI), or reference signal received quality (RSRQ). In other embodiments, the at least one memory and the computer program code may be configured, with the at least one processor, to receive an explicit indication from the network indicating which of the received instances of system information to use. In an embodiment, the at least one memory and the computer program code may be configured, with the at least one processor, to receive an indication of the number of system information instances that are broadcasted. According to some embodiments, the at least one memory and the computer program code may be further configured, with the at least one processor, to receive scheduling information, such as number of repetitions, time and frequency related information, power, modulation, coding, or transport block size.

Another embodiment is directed to an apparatus that may include receiving means for receiving one or more instances of system information from the network. For example, the system information may be received in one or more SIBs from an eNB. In an embodiment, the system information may include at least one of legacy system information or eMTC system information. Further, in some embodiments, the system information may be received for different coverage levels, such as normal, shallow, or deep coverage. According to an embodiment, the apparatus may further include determining means for determining which of the received instances of system information the UE should use. In one embodiment, the determining means may include means for determining which of the received instances of system information to use based on radio quality and/or power measurements, such as reference signal received power (RSRP), received signal strength indication (RSSI), or reference signal received quality (RSRQ). In other embodiments, the apparatus may include receiving means for receiving an explicit indication from the network indicating which of the received instances of system information to use. In an embodiment, the apparatus may also include receiving means for receiving an indication of the number of system information instances that are broadcasted. According to some embodiments, the apparatus may also include receiving means for receiving scheduling information, such as number of repetitions, time and frequency related information, power, modulation, coding, or transport block size.

Another embodiment is directed to a computer program embodied on a non-transitory computer readable medium. The computer program may be controlled by a processor to perform a process that includes receiving, by a UE, one or more instances of system information from the network. For example, the system information may be received in one or more SIBs from an eNB. In an embodiment, the system information may include at least one of legacy system information or eMTC system information. Further, in some embodiments, the system information may be received for different coverage levels, such as normal, shallow, or deep coverage. According to an embodiment, the process may further include determining which of the received instances of system information the UE should use. In one embodiment, the determining may include determining which of the received instances of system information to use based on radio quality and/or power measurements, such as reference signal received power (RSRP), received signal strength indication (RSSI), or reference signal received quality (RSRQ). In other embodiments, the process may include receiving an explicit indication from the network indicating which of the received instances of system information to use. In an embodiment, the process may include receiving an indication of the number of system information instances that are broadcasted. According to some embodiments, the process may also include receiving scheduling information, such as number of repetitions, time and frequency related information, power, modulation, coding, or transport block size.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
  receiving, by a user equipment, in one or more system information blocks instances of system information from a network,
  wherein the instances of system information comprises legacy system information and enhanced machine-type communication system information; and
  determining which of the received instances of system information to use based on signal power and quality thresholds for the user equipment, and radio quality and power measurements, wherein the radio quality and power measurements include reference signal received power and reference signal received quality.

2. The method according to claim 1, further comprising receiving an indication of a number of system information instances that are broadcasted.

3. The method according to claim 1, wherein the receiving further comprising receiving the system information for different coverage levels including normal, shallow, or deep coverage.

4. The method according to claim 1, further comprising receiving scheduling information comprising at least one of number of repetitions, time and frequency related information, power, modulation, coding, or transport block size.

5. An apparatus, comprising:
  at least one processor; and
  at least one memory including computer program code;
  the at least one memory and the computer program code are configured, with the at least one processor, to cause the apparatus at least to
  receive, in one or more system information blocks, instances of system information from a network,
  wherein the instances of system information comprises legacy system information and enhanced machine-type communication system information; and
  determine which of the received instances of system information to use based on signal power and quality thresholds for the apparatus, and radio quality and power measurements, wherein the radio quality and/or power measurements include reference signal received power and reference signal received quality.

6. The apparatus according to claim 5, wherein the at least one memory and the computer program code are further configured, with the at least one processor, to cause the apparatus at least to receive an indication of a number of system information instances that are broadcasted.

7. The apparatus according to claim 5, wherein the at least one memory and the computer program code are further configured, with the at least one processor, to cause the apparatus at least to receive the system information for different coverage levels including normal, shallow, or deep coverage.

8. The apparatus according to claim 5, wherein the at least one memory and the computer program code are further configured, with the least one processor, to cause the apparatus at least to receive scheduling information comprising at least one of number of repetitions, time and frequency related information, power, modulation, coding, or transport block size.

9. An apparatus, comprising:
- at least one processor; and
- at least one memory including computer program code;
- the at least one memory and the computer program code are configured, with the at least one processor, to cause the apparatus at least to
- signal system information in one or more system information blocks,
- wherein the system information comprises legacy system information and enhanced machine-type communication system information; and
- signal, to one or more user equipment, signal power and quality thresholds for the one or more user equipment to determine which of the legacy system information or the enhanced machine-type communication system information to use.

10. The apparatus according to claim 9, wherein the at least one memory and the computer program code are further configured, with the at least one processor, to cause the apparatus at least to signal system information for different coverage levels.

11. The apparatus according to claim 10, wherein the at least one memory and the computer program code are further configured, with the at least one processor, to cause the apparatus at least to signal system information block instances for each coverage level including normal, shallow, and deep coverage.

12. The apparatus according to claim 11, wherein the each coverage level depends on at least one of a distance between the user equipment and the apparatus or received signal power at the user equipment.

13. The apparatus according to claim 9, wherein the at least one memory and the computer program code are further configured, with the at least one processor, to cause the apparatus at least to signal scheduling information including at least one of number of repetitions, time and frequency related information, power, modulation, coding, or transport block size.

* * * * *